United States Patent Office 3,386,230
Patented June 4, 1968

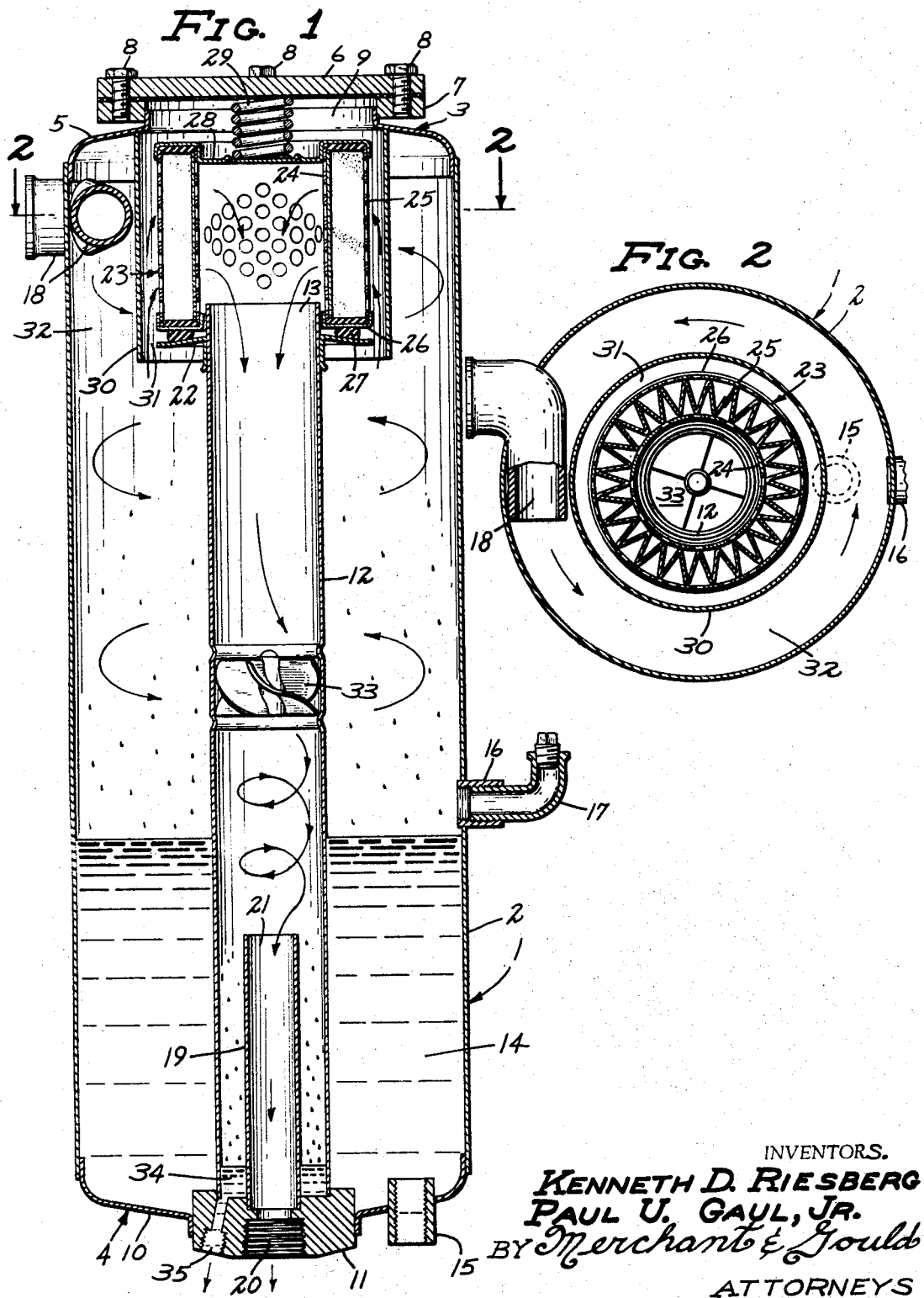

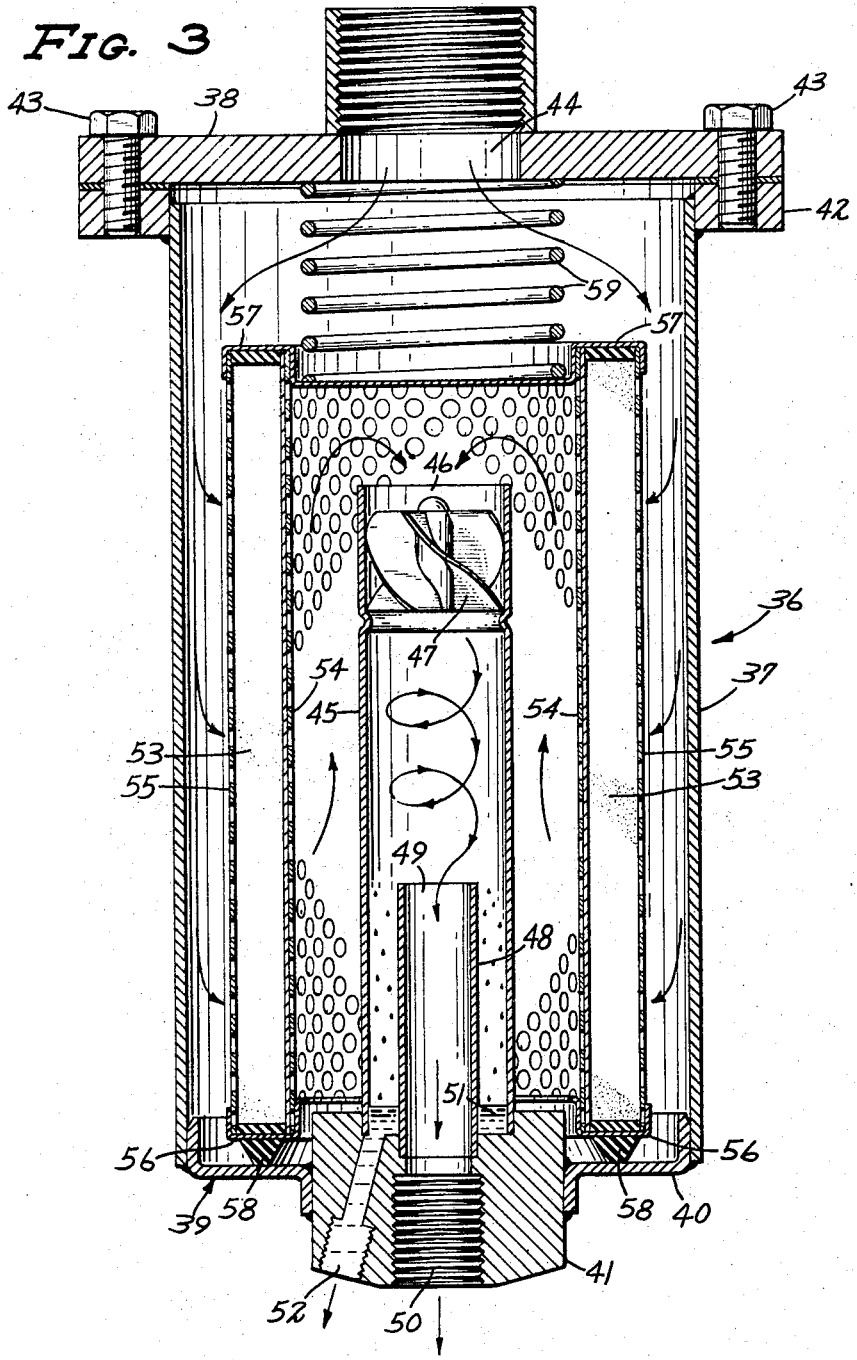

3,386,230
LIQUID AND GAS SEPARATOR
Kenneth D. Riesberg, Minneapolis, and Paul U. Gaul, Jr., St. Paul, Minn., assignors to Donaldson Company, Inc., Minneapolis, Minn.
Filed Dec. 27, 1966, Ser. No. 605,011
4 Claims. (Cl. 55—337)

ABSTRACT OF THE DISCLOSURE

A separator comprising a housing, an inlet generally tangentially to its wall, a pleated cylindrical filter coalescer surrounding an inlet of a tubular member provided with a helical van adjacent its inlet and a co-axial tube downstream thereof whereby liquid is separated from gas in the housing and tubular member.

Devices for separating liquids from gases by centrifugal action are known, examples of these being disclosed in U.S. Letters Patents Nos. 1,752,215, 1,838,507 and 1,994,110. These devices each utilize a series of baffles to induce scrubbing action on the gas for removal of liquid therefrom, and, in order to effectively remove the liquid from the gas, must be of relatively large size and utilize rather extensive baffle systems, it being borne in mind that the liquid particles entrained in the gas range from normal droplet size to sub-micron sizes, the latter being the most difficult to remove.

An important object of this invention is the provision of a liquid-gas separator which is of substantially smaller size than heretofore produced with similar liquid removing capacity.

Another object of this invention is the provision of a liquid-gas separator having means for coalescing minute liquid particles into particles of substantially larger size for easier separation of the liquid from the gas.

Another object of this invention is the provision of a liquid-gas separator which is relatively simple and inexpensive to produce, which is highly efficient in operation, and which is rugged in construction and durable in use.

The above, and still further highly important objects and advantages of this invention will become apparent from the following detailed specification, appended claims and attached drawings.

Referring to the drawings, in which like reference characters indicate like parts throughout the several views:

FIG. 1 is a view in axial section of a liquid and gas separator, produced in accordance with this invention, FIG. 2 is an enlarged transverse section taken substantially on the line 2—2 of FIG. 1; and FIG. 3 is a view corresponding to FIG. 1, but showing a modified form.

In the embodiment of the invention illustrated in FIGS. 1 and 2, a generally cylindrical housing 1 is shown as comprising a vertically disposed cylindrical wall 2, and upper and lower end walls 3 and 4 respectively. The upper end wall 3 comprises an annular wall member 5 and a plate-like closure member 6 that is secured to an annular flange 7 welded or otherwise rigidly secured to the annular wall member 5, concentric therewith. The closure member 6 is releasably anchored to the flange 7 by means of machine screws or the like 8. The annular wall member 5 defines an axial opening 9 that is normally closed by the closure member 6. The lower end wall 4 comprises an annular wall member 10 and a central fitting 11 welded thereto, the wall members 5 and 10 being welded at their marginal edge portions to the cylindrical wall 2.

An elongated cylindrical tubular member 12 has its lower end welded or otherwise rigidly secured to the fitting 11 and extends axially upwardly therefrom, concentric with the cylindrical wall 2, the tubular member 12 terminating at its open upper end 13 in downwardly spaced relationship to the closure member 6. The tubular member 12 cooperates with the cylindrical wall 2 and lower end wall 4 of the housing 1 to define an annular outer liquid reservoir 14 adjacent the lower end portion of the housing 1. The annular wall member 10 is provided with an outlet fitting 15, for a purpose which will hereinafter become apparent. The cylindrical wall 2, intermediate its opposite ends, is also provided with a fitting 16 in which is mounted a plug-equipped pipe elbow 17, commonly known as a street L, by means of which liquid may be supplied to the reservoir 13, when desired.

The housing 1 is provided with gas inlet means in the nature of a pipe fitting or street L 18 for introduction of gas to the interior of the housing 1, and directing the gas in a direction generally tangentially of the cylindrical wall 2. The inlet fitting 18 is disposed near the upper end of the housing 1, above the level of the open end 13 of the tubular member 12. An axial outlet tube 19 is disposed concentrically within the lower end portion of the tubular member 12, and has its lower outlet end anchored in the central fitting 11 of the lower end wall 4, said lower end of the outlet tube communicating with an outlet opening 20 in the fitting 11, the upper inlet end 21 of the outlet tube 18 being disposed considerably below the upper inlet end 13 of the tubular member 12.

A radially outwardly projecting circumferential mounting flange 22 is welded or otherwise rigidly secured to the upper end portion of the tubular member 12, the upper surface of the flange 22 providing a seat for a cylindrical coalescing element 23. The element 23 comprises an elongated sheet of porous filter material, preferably made from intertwined or interwoven metallic, plastic, glass or fabric fibers, the sheet being accordian pleated and formed into a cylinder with the fold lines running in a direction axially of the cylinder. The coalescing element 23 is held in cylindrical form by inner and outer cylindrical sleeves 24 and 25 respectively. As shown, the coalescing element 23 is disposed concentrically about the upper inlet end 13 of the tubular member 12, the lower end of the coalescing element 23 being provided with an annular member or ring 26 that ovelies the suporting flange 22, and which seats on the top surface of the flange 22 through the medium of a gasket or the like 27. The upper end of the coalescing element 23 is closed by a cap 28, and the element 23 is held in seating engagement with the flange 22 by a coil compression spring 29 interposed between the cap 28 and the closure member 6. It will be noted, with reference to FIG. 1, that the axial opening 9 in the upper end wall 3 is of larger diameter than that of the coalescing element 23, whereby to provide easy access of the element 23 to the interior of the housing 1. Seating of the element 23 on the flange 22, by means of the gasket 27, and closing of the upper end of the element 23 by the cap 28, assures that all of the liquid laden gas entering the housing through the inlet fitting 18 passes through the element 23 on its way to the outlet tube 19.

A cylindrical baffle 30 is welded or otherwise rigidly secured at its upper end to the annular upper wall member 5 concentric with the coalescing element 23 and tubular member 12, the baffle 30 extending downwardly from the upper end wall 3 to a level below the flange 22. The baffle 30 has an inner diameter substantially greater than the outer diameter of the element 23 and supporting flange 22, whereby to define therewith an annular passage 31 from the interior of the housing 1 to the element 23. Further, the baffle 30 cooperates with the upper end portion of the cylindrical wall 2 to define an annular inlet passage 32 for the incoming liquid-gas mixture. As the liquid laden gas enters the interior of the housing 1 through the inlet fitting 18, the same travels in a generally downwardly directed helical path through the inlet passage 32, droplets of liquid entrained in the gas being carried outwardly to the inner surface of the cylindrical wall 1 and flowing downwardly thereon to the reservoir 14. The air flows upwardly through the annular passage 31 and inwardly through the coalescent element 30 to the tubular member 12.

The embodiment of the invention illustrated in FIGS. 1 and 2 is intended for use in connection with gas compressors using liquid as a coolant and lubricant, such as screw or vane-type air compressors wherein the compressor elements are bathed in oil. With compressors of this type, a substantial amount of the oil becomes entrained in the compressed air and must be removed therefrom before the compressed air can be utilized in a number of applications. As above indicated, oil entrained in air entering the housing through the inlet-fitting 18 ranges from substantially droplet size downwardly to a fine mist comprising particles measuring one micron or less. During movement of the oil laden air through the annular passage 32, it has been found that particles of oil measuring approximately 30 microns and larger are effectively removed by centrifugal action. The smaller lightweight particles are carried by the air to the coalescent element 23 and become attached thereto, the air passing freely through the porous material of the element 23 and continuing downwardly through the tubular member 12 to the outlet pipe 19 and outwardly through the outlet opening 20. As the air continues to move through the element 23, the fine particles of oil carried thereby join together or coalesce to form larger droplets which are carried by the air into the interior of the tubular member 12. For the purpose of removing these particles, a multi-bladed helical vane 33 is mounted in the interior of the tubular member 12 in upwardly spaced relation to the upper inlet end 21 of the outlet tube 19. As the air moves downwardly through the tubular member 12, the vane 33 imparts a spiral or helical movement thereto, causing the particles of oil entrained in the air to move outwardly into engagement with the inner surface of the tubular member 12 through centrifugal action. The oil free air then moves downwardly through the tubular member 19 and outwardly through the outlet opening 20, the oil removed therefrom gravitating downwardly into an inner annular oil-receiving sump 34 defined by the fitting 11, tubular member 12, and outlet tube 19. An outlet passage 35 in the fitting 11 communicates with the sump 34, for removal of oil accumulating therein.

From the above, it will be seen that the oil laden air introduced to the interior of the housing 1 passes through three different stages before flowing outwardly through the outlet tube 19. In the first stage, wherein the oil laden air moves circumferentially and helically through the annular passage 32, the greater proportion of the oil is removed. In the second stage, wherein the air passes through the coalescing element 53, the channeling effect of the porous material of the coalescing element induces the fine oil particles to coalesce or conglommerate into larger droplet size and be carried by the air downwardly through the tubular member 12. In the third stage, between the vane 33 and inlet end 21 of the outlet tube 19, the oil droplets are removed from the air by centrifugal action, and dry, oil-free air flows outwardly through the outlet opening 20.

With the above-described arrangement, it has been found that the separator can be of substantially smaller size than those heretofore produced for given gas or air flow requirements. As an example a separator as above described, having an outside diameter of approximately six inches and an overall length of approximately sixteen inches has been used to effectively remove all of the five gallons per minute of oil entrained in a five cubic feet per minute compressed air stream. In practice, an oil conduit is connected to the outlet fitting 15 and to an oil bathed screw-type air compressor, the reservoir 14 serving as a reservoir for the compressor, not shown. When thus used, the fitting 17 is utilized to initially introduce oil into the reservoir 14.

In the embodiment of the invention illustrated in FIG. 3, a cylindrical housing 36 is shown as comprising a cylindrical wall 37, and upper and lower end walls 38 and 39 respectively, the lower end wall 39 comprising an annular wall member 40 and a central fitting 41, the annular wall member 40 being welded to the lower end of the cylindrical wall 37 and to the central fitting 41. At its upper end, the cylindrical wall 37 is provided with an annular flange 42 projecting radially outwardly therefrom, the upper end wall 38 providing a closure member for the upper end of the housing and being secured to the flange 42 by machine screws or the like 43. The upper end wall 38 is formed to provide an axial inlet opening 44 to the interior of the housing 36.

An axial tubular member 45 is rigidly secured at its lower end to the central fitting 41, and has its open upper inlet end 46 disposed in downwardly spaced relationship to the upper end wall 38. A multi-bladed helical vane 47 is fixedly mounted in the upper end portion of the tubular member 45, and an axial outlet tube 48 is rigidly mounted at its lower end in the fitting 41 and has its upper inlet end 49 disposed in downwardly spaced relationship to the vane 47. The outlet tube 48 communicates at its lower end with an axial gas outlet opening 50 in the central fitting 41. The outlet tube 48 cooperates with the fitting 41 and lower end portion of the tubular member 45 to define an annular sump 51 for collection of separated-out liquid, such as oil, which may be withdrawn from the sump 51 through an outlet passage 52 in the central fitting 41.

A coalescing element 53, similar to the element 23, is mounted between concentric perforate cylindrical inner and outer shells 54 and 55, and is provided at its lower end with an annular member or ring 56 and at its upper end with an imperforate cap 57. The upper surface of the lower annular wall member 40 provides an annular seat for the lower end of the coalescing element 53, the ring 56 having sealing engagement with the annular wall member 40 through the medium of an annular gasket 58. As shown in FIG. 3, the coalescing element 53 extends upwardly above the inlet end 46 of the tubular member 45, the cap 57 being upwardly spaced from the upper end of the tubular member 45. A coil compression spring 59 is interposed between the upper end wall 38 and the cap 57 to yieldingly urge the coalescing element 53 into sealing engagement with the top surface or annular seat defined by the annular wall member 40, and to hold the element 53 against lateral shifting within the housing 36.

The modified form of the invention illustrated in FIG. 3 is designed particularly for use with air or gas compressors of the piston type wherein the pumping elements are not bathed in oil as in the screw-type compressors. In the piston-type compressors, liquid such as oil, is taken therefrom and entrained in the compressed air at a much lower rate than in the oil bathed type of compressor. The oil which does become entrained in the compressed air is in the form of a very fine mist which is not readily separated from the air through centrifugal action. Hence, the oil mist laden air is conducted axially into the interior of the housing 36 through the inlet opening 44 and directed radially inwardly through the coalescing element 53, the oil particles entrained in the air collecting in the coalescing element and joining to form larger droplets which are carried through the vane 47 to the space therebetween and the inlet end 49 of the outlet tube 48, in which space the droplets are separated from the air by centrifugal action and descend by gravity to the sump 51.

While we have shown and described two forms of our novel liquid and gas separator, it will be understood that the same is capable of further modification without departure from the spirit and scope of the invention, as defined in the claims.

What is claimed is:
1. A liquid and gas separator comprising:
(a) a housing having a peripheral wall and opposite end walls, said housing having spaced gas inlet and outlet means,
(b) a tubular member within said housing and having one end secured to one of said housing end walls and an opposite open inlet end axially spaced from the other of said housing end walls,
(c) a gas outlet tube in said tubular member generally co-axial therewith, said gas outlet tube being of substantially shorter axial length than said tubular member and having a gas delivery end secured to said end wall to which the tubular member is secured and in communication with said gas outlet means and an opposite inlet end longitudinally inwardly spaced from the inlet end of said tubular member,
(d) vane means in said tubular member between said inlet ends of the tubular member and the gas outlet tube and in axially spaced relation to said gas outlet tube for guiding the gas in a helical path,
(e) and a coalescing element of porous sheet filter material mounted in said housing between said inlet means and the inlet end of said tubular member, said coalescing element being in the form of a pleated cylinder generally co-axial with said tubular member and surrounding the inlet end thereof and including means so disposed that all of the gas flows generally radially inwardly through said coalescing element to the inlet end of said tubular member without by-passing the coalescing element.

2. The liquid and gas separator defined in claim 1, in which said gas inlet means is disposed adjacent the other of said housing end walls, including means for directing incoming gas in a circular path about the axis of said housing, and a cylindrical baffle extending from said other end wall toward said one of the end walls generally concentrically outwardly of said coalescing element, said baffle cooperating with said tubular member and coalescing element to define an annular passage to and around said coalescing element.

3. The liquid and gas separator defined in claim 1, in which said housing is normally generally vertically disposed, said end walls comprising upper and lower end walls of the housing, said tubular member and gas outlet tube being secured to said lower end wall and projecting upwardly therefrom, said gas outlet means being disposed in said lower end wall, including a radially outwardly projecting circumferential mounting flange on said tubular member defining an annular seat for one end of said coalescing element, said upper end wall defining an opening for reception of said coalescing element and a closure member for said opening, a cap closing the end of said coalescing element opposite said flange, yielding means between said cap and closure member urging said coalescing element into operative seating engagement with said flange, said gas inlet means comprising a generally tangentially directed inlet element in said cylindrical wall adjacent said upper end wall, and a cylindrical baffle extending downwardly from said upper end wall generally concentrically outwardly of said coalescing element to a level below said inlet element and flange, said baffle cooperating with said tubular member and coalescing element to define an annular gas passage to and around said coalescing element.

4. The liquid and gas separator defined in claim 3 in which said tubular member, cylindrical wall and lower end wall define an annular outer liquid reservoir, and said tubular member, gas outlet tube and lower end wall defining an annular inner liquid sump, characterized by liquid filler means in said cylindrical wall and independent liquid outlets to respective ones of said reservoir and sump through said lower end wall.

References Cited
UNITED STATES PATENTS

| | | | |
|---|---|---|---|
| 1,532,657 | 4/1925 | Fleisher | 55—326 |
| 1,830,095 | 11/1931 | Dollinger | 55—302 |
| 2,018,131 | 10/1935 | Kamrath | 55—329 |
| 2,302,116 | 11/1942 | Gill | 210—512 |
| 2,557,332 | 6/1951 | Wright | 55—455 |
| 2,659,451 | 11/1953 | Baird | 55—347 |
| 2,823,760 | 2/1958 | Anderson | 55—327 |
| 2,848,060 | 8/1958 | McBride et al. | 55 |
| 3,187,895 | 6/1965 | Pall et al | 210 |

FOREIGN PATENTS

| | | |
|---|---|---|
| 1,158,809 | 2/1958 | France. |
| 960,504 | 6/1964 | Great Britain. |

HARRY B. THORNTON, *Primary Examiner.*

B. NOZICK, *Assistant Examiner.*